Sept. 30, 1969    J. O. HATTON    3,469,377
APPARATUS FOR CUTTING MARINE PLANTS
Filed June 3, 1966    4 Sheets-Sheet 1
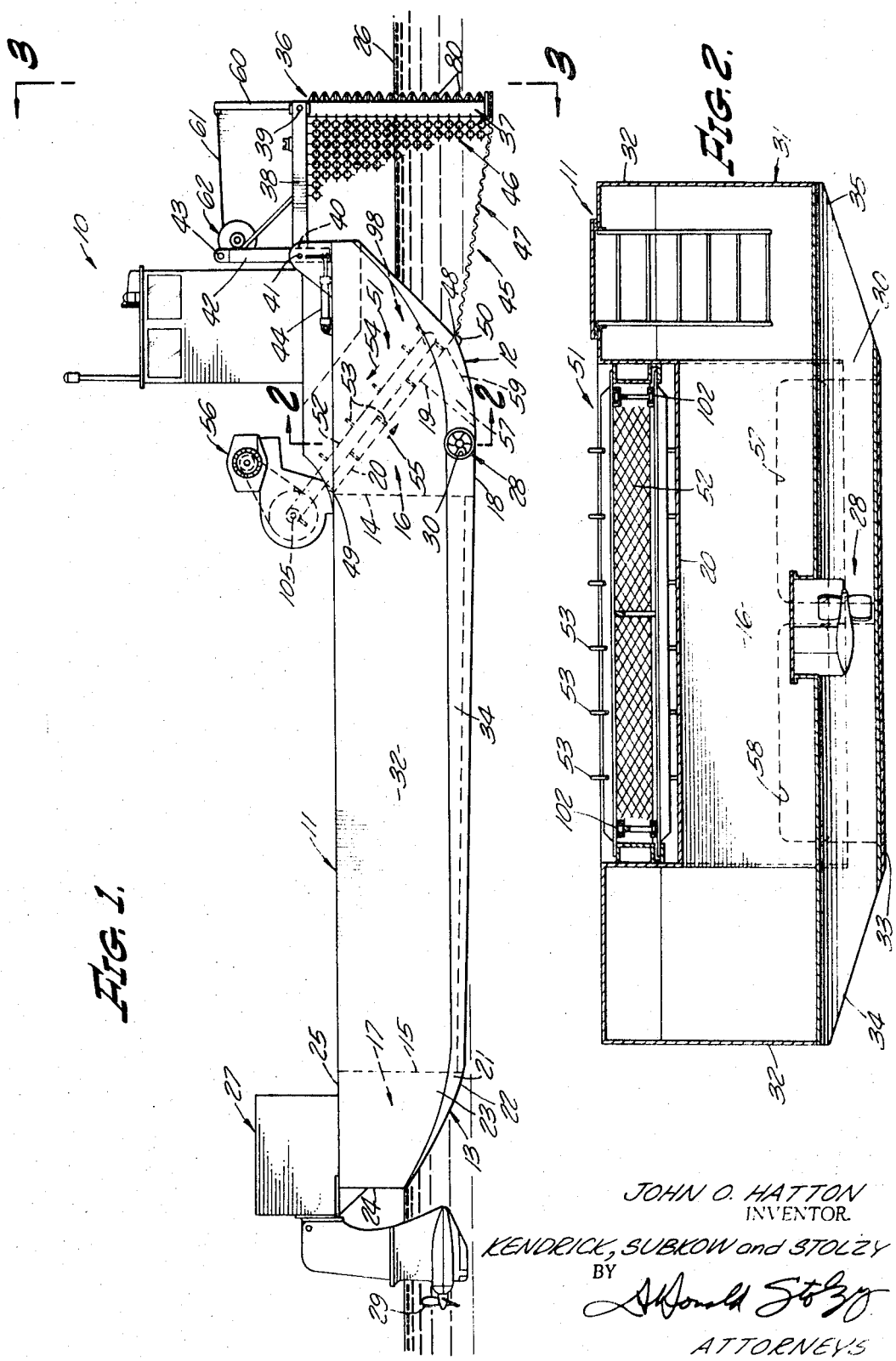
JOHN O. HATTON
INVENTOR.
KENDRICK, SUBKOW and STOLZY
BY
ATTORNEYS

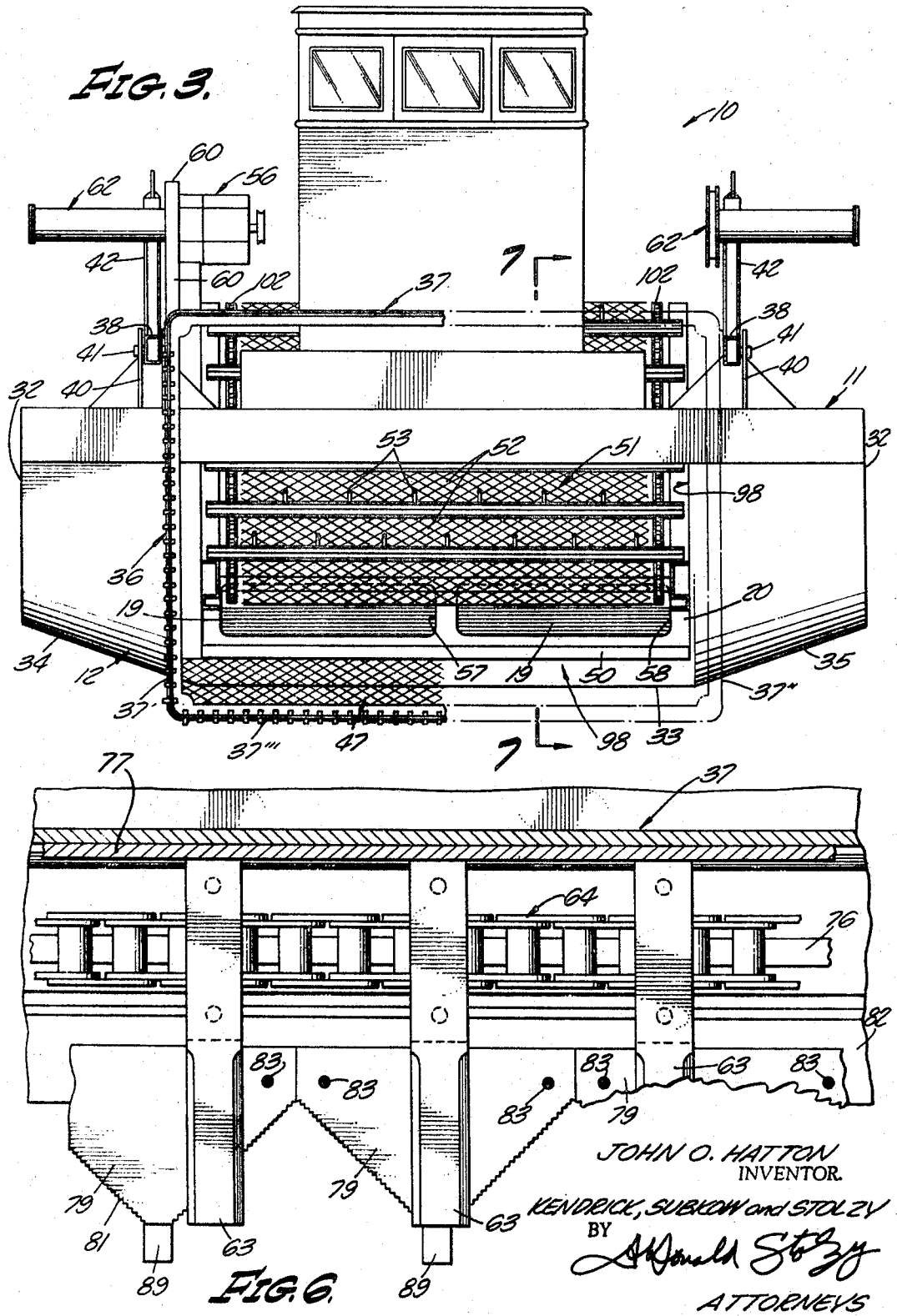

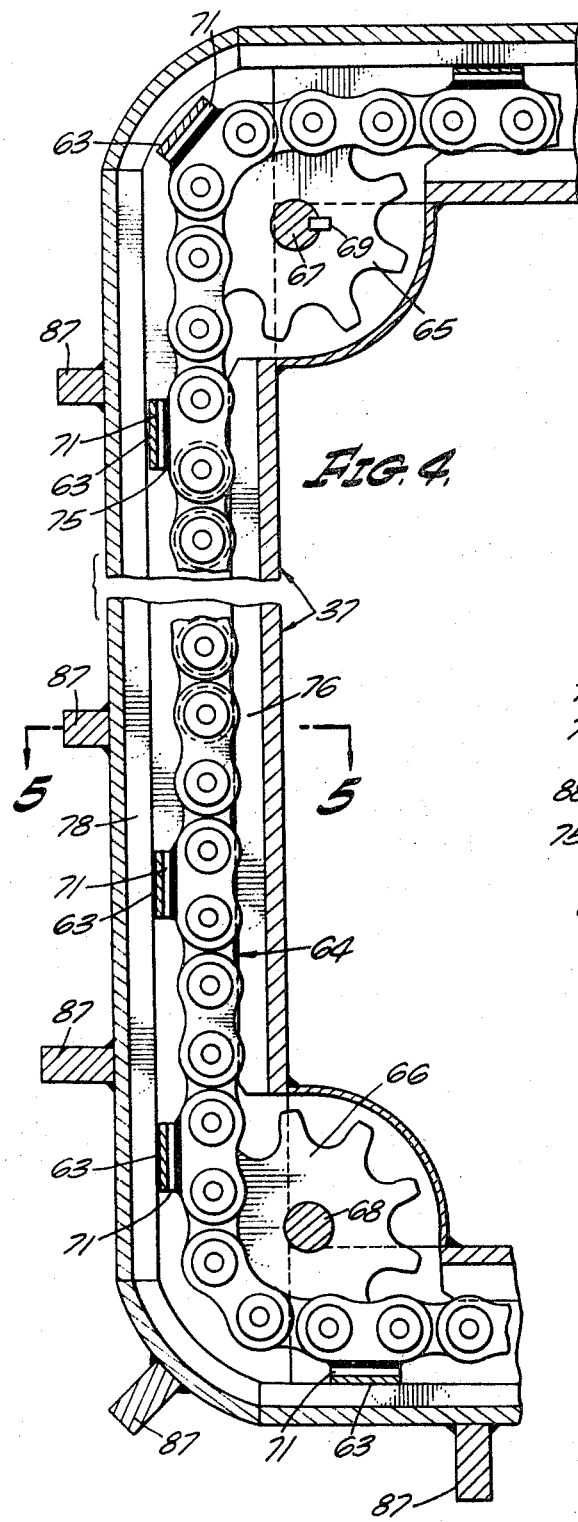

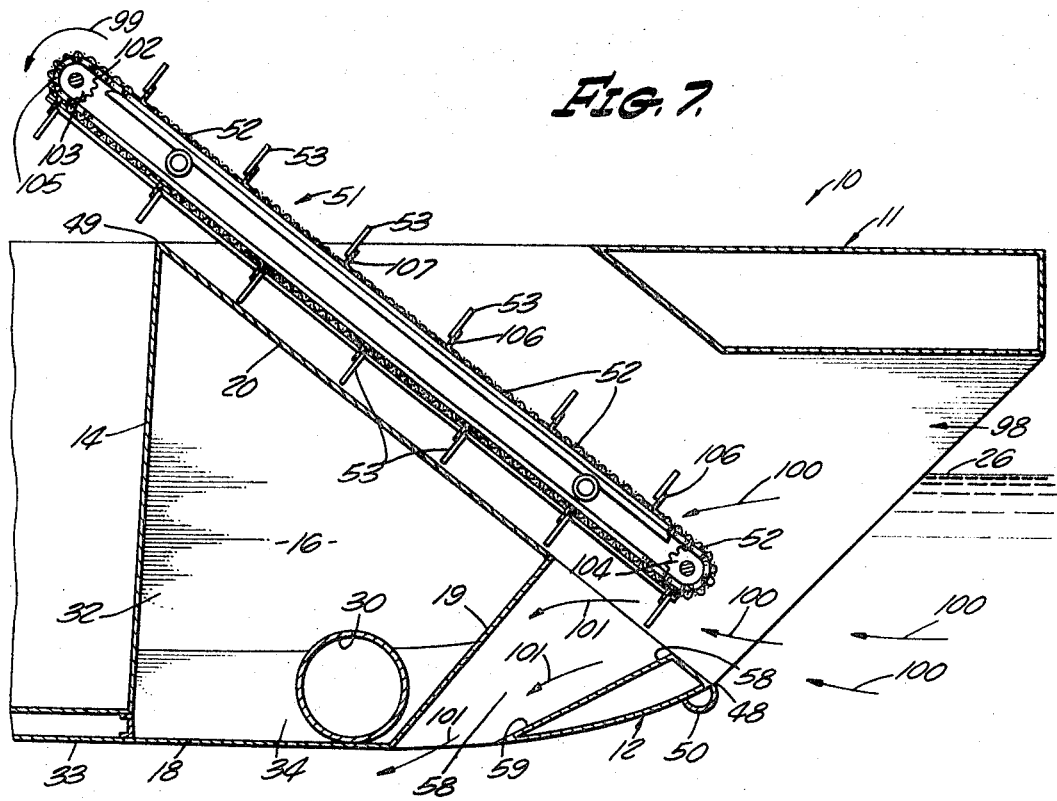

United States Patent Office 3,469,377
Patented Sept. 30, 1969

3,469,377
APPARATUS FOR CUTTING MARINE PLANTS
John O. Hatton, Chula Vista, Calif., assignor to Kelco Company, San Diego, Calif., a corporation of Delaware
Filed June 3, 1966, Ser. No. 555,076
Int. Cl. A01d 45/08; B63b 35/02
U.S. Cl. 56—9                                                         19 Claims

ABSTRACT OF THE DISCLOSURE

An apparatus for cutting marine plants in which a mower is rotatably suspended from a barge at the bow thereof such that the mower can rotate rearwardly and upwardly about its axis of rotation to permit the mower to move out of the way of underwater rocks and other obstructions and prevent damaging collisions therewith, and including return means to yieldingly resist rotational movement of the mower and to return the mower to an upright position. Positioned behind the mower at the bow of the barge is a cut seaweed receiving means which may include a conveyor fixed to the bow, there being no connection between the conveyor and the mower such that the mower is able to move inwardly without contacting the conveyor. The mower may include a rectangular frame having at least one set of fixed knife sections and one set of movable knife sections, and the bow of the barge may have a hole extending rearwardly and downwardly therethrough, said hole being positioned behind the conveyor to convey water away from the cut seaweed which is lifted upwardly and deposited in the hull of the barge. A flexible net may be connected between the mower and the barge so as to provide for movement of the mower with respect to the barge and to prevent loss of cut seaweed during its movement from the mower to the barge.

---

This invention relates to surface vessels, and more particularly to a barge or the like having equipment aboard to cut off the tops of marine plants.

Although the apparatus of the present invention may have a large scope of application and should therefore not be limited to those specific uses disclosed herein, the invention has been found to possess exceptional utility in harvesting kelp in shallow waters. Some of the many uses of kelp are described in U.S. Patent No. 2,699,135 issued Jan. 11, 1955, to Arnold B. Steiner for "Apparatus for Marine Transport of Kelp."

Notwithstanding the usefulness of the present invention as a kelp harvester, it also can be employed to cut or to harvest a water or underwater plant or seaweed such as water hyacinth.

In recent years, water hyacinth was purposely been planted especially in inland waters in the United States to provide ample food for fish. Unfortunately, this plant has grown rank and is now more of a menace than a help. It is a hazard to navigation.

Both water hyacinth and kelp grow in waters that are difficult to navigate. Water hyacinth grows in a great many places over the United States and kelp beds are found on both the east and west coasts. Many of the kelp beds on the east coast are found in the shallow waters of inland ways and bays along the eastern seaboard. They begin near the northern part of State of Maine. They extend therefrom into the Bay of Fundy and around the entire peninsula which is the Canadian province of Nova Scotia, and toward the north and west therefrom. These waters are difficult to navigate because they are shallow and filled with many sharp and dangerous rocks and other similar underwater obstructions. These rocks are also so great in number that it is not practical to plot their location and to pilot a vessel to avoid them.

In the past, the use of conventional kelp harvesters has met with extreme difficulty in the shallow waters around Nova Scotia. In the first place, it was the prior art practice to fix a conventional reciprocating mowing machine to the forward end of a kelp conveyor suspended from the bow of a barge forward thereof. Thus, when the mowing machine struck a rock, the machine, the conveyor or the barge would become damaged or two or all three of these structures would become damaged. Due to the fact that the conveyor is rigidly fixed to both the mowing machine and the barge, any force acting on the mowing machine is transmitted to the conveyor. The conveyor in turn, transmits this force to the barge because the conveyor is also fixed to the barge.

In the prior art kelp harvesters, the conveyor has been suspended from the barge forward of the bow in an exposed and precarious and unprotected position. That is, by being unprotected it could become damaged by collision with a rock during a sidewise movement of the barge.

The type of mowing machine which has been employed in the prior art kelp harvesters is similar to or identical to that employed in a conventional grain harvester. That is, it employs one stationary sickle bar having a series of knife sections fixed to it, and a reciprocating sickle bar also having a series of knife sections fixed to it. However, in marine use, this type of machine has several disadvantages. Use of only the two sets of knife sections makes it possible for the knife sections to become jammed with kelp or damaged very easily. The reciprocatory motion is produced by a pitman. This also makes the heavy duty use of the equipment impossible.

Often in the use of a conventional kelp harvester a quantity of cut kelp is lost. This is due to several factors. Wind and current play a part. Further, kelp stands straight up in the water below its surface because it is buoyant. Thus, when the top of a kelp plant is trimmed off, the cut top immediately floats. Due to the fact that there is nothing on the sides of the conveyor to guide the cut kelp to the conveyor, some of the kelp floats away and is inevitably lost.

In the prior art it has been the practice to load kelp into bins high on the barge deck. Thus, in shallow waters the load could be lost by the barge hitting a rock and overturning. Overturning, further, is dangerous because the load is often greater in weight than the barge itself and the center of gravity of both barge and load is very high.

In accordance with the apparatus of the present invention, the above-described and other disadvantages of the prior art are overcome by providing a seaworthy boat having means to cut or harvest kelp, water hyacinth or any other seaweed or marine plant. Further, for use herein, the word "seaweed" is hereby defined to include any marine plant.

According to an outstanding feature of the present invention, a mowing device is suspended from a boat in a position movable relative thereto. Thus, when the mowing device strikes a rock, the force of the rock against the mowing device is not transmitted to the boat or any other structure connected with the boat. For example, if a conveyor is used, neither the conveyor nor the boat is damaged by the collision of the mowing device with a rock.

According to a feature of the invention, the mowing device may be raised and lowered hydraulically to control the cutting depth of the device. The mowing device may also be raised and lowered to avoid rocks and other objects. The mowing device may also be raised completely out of the water so that it can be supported in a safe position wholly out of the way of any underwater obstruction while traveling to and from a location where kelp is to be harvested.

According to another outstanding feature of the present invention, the mowing device is supported in a manner to spring back to a, for example, vertical position once the mowing device has struck an object and moved rearwardly and upwardly to avoid it.

The mowing device of the present invention may incorporate two sets of laterally spaced knife sections fixed relative to each other, and a third series of movable knives between the said fixed sets. It is important to this invention that both the moving knives and the fixed knife sections be serrated.

According to a feature of the invention, the fixed sets of knife sections may have fixed metal projections extending above and forwardly beyond the forward points of the knife sections to keep them from spreading apart assuring a shearing action and protection.

It is an advantage of the present invention that the movable and spring biased mowing device can aid in navigation. That is, when the mowing device strikes a rock, there is ample time for the barge or boat to be brought to a complete stop before the hull strikes the obstruction. The mowing device may be raised till clear of the obstruction. A graduated scale on the frame of the mowing device may be employed to indicate the depth of water which will determine whether or not the hull of the barge will pass over the obstruction.

It is a feature of the present invention that a conveyor is used behind the mowing device. However, it is a special feature of the present invention that the conveyor is recessed in the barge. It can therefore be maintained in a safe position protected from rocks or other underwater obstructions.

The use of the two sets of fixed knife sections in the mowing device of the present invention prevents the device from becoming jammed with kelp. It also protects the moving knives. Further, the moving knives are fixed to a chain which is driven continuously in one direction during one mode of its operation. Its operation is thus continuous as opposed to reciprocatory. However, during any one run its motion may be reversed if that is desired for any reason. The use of this equipment is more trouble-free than the reciprocating arrangement employed in mowing devices of the prior art.

It is another feature of the present invention that a net is connected from the mowing device to the barge. This net prevents cut kelp from being lost and guides the cut kelp to the conveyor. It is also a feature of this construction that the net is flexible and therefore can move with the mowing device should it strike a rock or the like.

The net which extends upwardly along each side of the mowing device can become plugged up with cut kelp due to the flow thereof with water into the net. Should the sides of the net become plugged with cut kelp, the inflow of water can cause the net to bulge and retract the mowing device. It may thus be held in an undesirable position. In accordance with the apparatus of the present invention, this effect is avoided by the use of a hole or passageway that extends through the bow of the barge at an angle inclined downwardly toward the rear of the barge. This permits water to flow more easily out of the space within the net, and to deposit more kelp on the conveyor.

It is also a feature of the present invention that the conveyor has an open mesh which is positioned in front of the hole. The conveyor therefore effectively strains the kelp out of the water which passes through the conveyor into the hole.

In accordance with another feature of the present invention, a floatation tank is provided in both the bow and the stern of the barge. A conveyor is employed to carry seaweed that is cut by the mowing device over the top of the bow floatation tank and to dump the kelp downwardly into the bottom of the hull of the barge. In accordance with this feature of the invention, the center of gravity of the combined weight of the load and the barge itself is kept low. This prevents the barge from being overturned by hitting a rock or any other underwater obstruction.

The above-described and other advantages of the present invention will be better understood from the following description when considered in connection with the accompanying drawings.

In the drawings, which are to be regarded as merely illustrative:

FIG. 1 is a side elevational view of a harvester constructed in accordance with one embodiment of the subject invention;

FIG. 2 is a transverse sectional view through the bow of the barge taken on the line 2—2 shown in FIG. 1;

FIG. 3 is a front elevational view of the harvester taken on the line 3—3 shown in FIG. 1;

FIG. 4 is an enlarged front elevational view partly in section of a mower cutter blade assembly;

FIG. 5 is a transverse sectional view of the assembly taken on the line 5—5 shown in FIG. 4;

FIG. 6 is a vertical sectional view of the assembly taken on the line 6—6 shown in FIG. 5;

FIG. 7 is a longitudinal sectional view of the harvester taken on the line 7—7 shown in FIG. 3;

FIG. 8 is a top plan view of a conveyor shown in FIG. 7; and

FIG. 9 is a transverse sectional view of a portion of the conveyor taken on the line 9—9 shown in FIG. 8.

In the drawing in FIG. 1, a kelp harvester 10 constructed in accordance with the present invention is shown in a side elevational veiw. Harvester 10 includes a barge 11 which has a bow 12 and a stern 13. Barge 11 is essentially a hull or empty shell rearward of a bow bulkhead 14 forward of a stern bulkhead 15. The hull of barge 11 is thus employed to transport kelp when loaded into the space between the bow and stern bulkheads 14 and 15.

Kelp may be loaded into the barge 11 all the way to the deck immediately above the hull. For stability, bow and stern flotation tanks are provided at 16 and 17, respectively. Note will be taken that these means are employed to stabilize barge 11 because the load is carried low in barge 11 and not on an upper deck as in the said U.S. Patent No. 2,699,135.

If desired, the entire hull of barge 11 may be a double skinned hull of a welded metal watertight construction for protection against collisions with underwater rocks and other objects.

Bow and stern flotation tanks 16 and 17 may conform to the shape of the hull. They may have upper welded watertight enclosures, if desired. The general shape of bow flotation tank 16 may be best understood as being encompassed by a portion 18 of the hull, a bulkhead 19, an intake ramp 20 and bow bulkhead 14. Stern floatation tank 17 is encompassed by stern portions of the hull of barge 11 at 21, 22, 23 and 24. Floatation tank 17 also may have an upper cover or after deck 25. Tank 17 may be enclosed by bulkhead 15. Both floatation tanks 16 and 17 may be completely enclosed by metal plates welded watertight.

Barge 11 is propelled and maneuvered in the water at 26 by two conventional outboard motors 27, and a transverse bow thruster 28. Only one motor 27 is shown. Each motor 27 may be mounted one-third the distance in from the side of barge 11. Each motor 27 may be controlled independently. The drive for each motor 27 includes a screw 29 which may be turned to maneuver barge 11. The screw 29 for each motor 27 may be turned independently.

Each motor 27, each screw 29 and bow thruster 28 may be entirely conventional in themselves. It is conventional to use two stern drives on the same craft. It is also conventional to use a bow thruster with a single stern drive. It is not conventional to use a bow thruster with two stern drives. Accordingly, it is an advantage of the present invention that one stern drive may be rotated 90° and used with bow thruster 28 to move barge 11 sideways while the other stern drive is employed to move barge 11 forward and in reverse.

Note will be taken that bow thruster 28 is located in a cylindrical passage 30 extending completely through barge 11 as shown in FIG. 2. Note will be taken that the foregoing features of the two motors 27 and bow thruster 28 not only provide superior maneuverability, they also serve to hold the barge 11 in any desired position against the force of wind and current.

As stated previously, kelp is dumped into the hull between bulkheads 14 and 15. It will be appreciated that water no doubt will accumulate in the bottom of the barge between bulkheads 14 and 15. For this reason, conventional means, including pumps, may be employed to keep barge 11 relatively free of water. It may be pumped through or over the side. No such means are shown. In addition, to move kelp either within barge 11 between bulkheads 14 and 15, any of the means disclosed in the said patent may be used. Such means may include a drag line identical to that shown in the patent or one different therefrom. The same is true of the other kelp handling equipment disclosed in the patent.

As shown in FIG. 2, barge 11 has a hull 31 with vertical side walls 32, a flat bottom 33 and inclined walls at 34 and 35. Barge 11 is therefore a shallow draft vessel that draws very little water, either loaded or light. Barge 11 is built to withstand running into or onto rocks.

As shown in FIG. 1, a cutter assembly 36 is suspended from the bow 12 of barge 11. The details of the construction of the cutter assembly 36 will be described hereinafter. Suffice it to say here that the cutter assembly has a rectangular mounting frame 37 that is pivotally suspended from a pair of arms 38 at a pair of corresponding pivot shafts 39. Arms 38 are, in turn, pivoted from two clevises 40 fixed to bow 12. Arms 38 are pivoted about shafts 41 through clevises 40.

An arm 42 is fixed to each arm 38. The end of each arm 42 has a hole 43 therethrough. If desired, in the retracted position, the end of each arm 42 may be hooked to the deck of bow 12.

A conventional hydraulic ram 44 is connected from the deck of bow 12 to arm 42. Actuation of ram 44 rotates arms 38 and 42 to the left approximately 90°. In this event, frame 37 remains in a generally vertical position all the time that arms 38 and 42 rotate and, after they become stationary in their rotated positions. Frame 37 is then suspended from arms 38 in an approximately vertical position at the forward end of bow 12 well above the surface of water 26.

A construction which may be described as a net 45 is connected from frame 37 to the sides and bottom of bow 12. Net 45 includes two side sections 46, and a bottom section 47. Sections 46 and 47 more or less collapse when frame 37 is lifted completely out of the water at 26.

As shown in FIG. 1, bulkhead 20 has a lower edge 48 and an upper edge 49. Net section 47 is connected from the bottom of frame 37 to the bottom edge 48 of bulkhead 20. A half round pipe 50 is welded at the lower edge of bulkhead 20 for strength.

A conveyor 51 is mounted on bulkhead 20 of bow 12. As shown in FIG. 2, conveyor 20 includes sections of screen wire or a wire mesh similar to a chain link fence at 52. Between sections of mesh 52, a row of prongs 53 are fixed to conveyor 51 in positions to pick up kelp and dump it into the hull of barge 11 rearward of bulkhead 14. Prongs 53 on top of conveyor 51 move in a direction of arrow 54 shown in FIG. 1. Prongs 53 on the bottom of conveyor 51 move in the direction of arrow 55 shown in FIG. 1. Conveyor 51 is moved by a conventional motor and driving assembly 56 mounted in a fixed position by conventional means to the deck of bow 12.

As shown in FIG. 3, the hull of barge 11 has a pair of holes 57 and 58 which extend downwardly and rearwardly completely through the hull. These holes begin at and extend through bulkhead 20 between the surfaces indicated at 19 and 59 in FIG. 1.

In FIG. 1, a cutter assembly 36 is shown in its operative position. In this position, a pair of arms 60 fixed to frame 37 projects upwardly from frame 37. A cable 61 is fixed to the end of arm 60. Cable 61 extends to and is wound around the reel of a cord reel 62. The reel or cord reel 62 is spring biased to pull the top of arms 60 to the rear. If desired, arms 38 may have a conventional stop to maintain frame 37 in a vertical position should tension be applied to cable 61 at all times. Alternatively, cable 61 need not be supplied with any tension while frame 37 is in a vertical position, as shown. Cord reel 62 may be entirely conventional. The housing of cord reel 62 is fixed to arm 42.

The port side of barge 11 may be identical to the starboard side as shown in FIG. 1, if desired.

Cutter assembly 36 may include, among a great many other structures which will be described, a set of movable knife sections 63 as shown in FIGS. 5 and 6. Knife sections 63 are fixed to a chain 64 as shown in all of FIGS. 4, 5 and 6. Chain 64 is guided in frame 37 which acts as a housing for chain 64.

As stated previously, frame 37 is rectangular. Four sprockets are rotatably mounted in frame 37, one at each corner. One sprocket is shown at 65, and one sprocket is shown at 66 in FIG. 4. Sprocket 65 is rotatable with shaft 67. Sprocket 66 is freely rotatable around shaft 68, which may be stationary if desired. Sprocket 65 is keyed to shaft 67 at 69. Shaft 67 is driven by a conventional hydraulic motor welded to frame 37. The hydraulic motor is not shown.

As shown in FIG. 5, knife sections 63 are fixed to chain 64 by right angle mounting brackets 70 and 71 which are welded to chain 64 at 72 and 73, respectively, and to knife section 63 at 74 and 75, respectively.

A bearing guide for chain 64 is provided at 76. Kelp is directed upwardly between knife sections 63 as viewed in FIG. 5. This therefore presses knife section 63 backwardly against a bearing plate 77 fixed inside of frame 37. A bearing guide 78 is also provided for knife section 63.

Cutter assembly 36 has a set of fixed inner knife sections 79 and a series of fixed outer knife sections 80. Knife sections 79 and 80 are triangular in shape and have beveled or tapered serrated edges at 81. Knife sections 79 and 80 are identical. Knife sections 79 are welded to a portion 82 of frame 37 at 83. Knife sections 80 are welded to a portion 84 of frame 37 at 85. A set of webs 86 are fixed to portion 82 to brace knife sections 79. A set of webs 87 are fixed to a portion 88 of frame 37 to support knife sections 80. However, neither of webs 86 or 87 are welded to knife sections 79 or 80. Further, note will be taken that the ends of webs 86 and 87 project beyond the pointed ends of knife sections 79 and 80 at 89 and 90, respectively, to protect knife sections 79 and 80.

Net sections 46 and 47 are again shown in FIG. 5. Net section 46 simply includes a series of rings 91 which are interconnected. An end set of rings 91' extends through an opening 92 in a bracket 93 fixed to frame 37. Rings 91 may be looped through the triangular openings in net section 47, if desired. The net section 46 on each side of frame 37 may be identical.

Net section 47 has loops through which a rod 94 is assembled. For this purpose, a mounting bracket 95 is fixed to frame 37. Bracket 95 has an ear 96 integral therewith. One ear 96 is disposed on each end of bracket 95, one being shown in FIG. 5. Each ear 96 thus has an opening 97 therethrough to carry rod 94.

As shown in FIGS. 1, 3 and 7, bow 12 actually provides a passageway 98 through which cut kelp is taken into barge 11. As shown in FIG. 7, water 26 enters passageway 98. The kelp is thus effectively strained from the water 26 by a wire mesh 52 of conveyor 51, and the prongs 53 fixed to conveyor 51. This is true because conveyor 51 extends over hole 58 through the bottom of barge 11. Note will be taken when conveyor 51 moves in the direction of 99 shown in FIG. 7, prong 53 will project outwardly over and wholly protect passageway 58 from being clogged with cut kelp. Water and cut kelp will flow in the direction of arrows 100. Water then flows down hole 58 in the direction of arrows 101.

Note will be taken that the forward and lower end of conveyor 51 lies rearward of the forward and lower edge 48 of bulkhead 20. Conveyor 51 is thus protected within bow 12 inside passageway 98 from underwater rocks or other obstructions. It is therefore an advantage of the present invention that conveyor 51 is protected, whereas the conveyor of the said patent is supported in a position outside the barge exposed to the hazard of collision with rocks and other underwater obstruction.

Note will be taken from FIG. 7 that wire mesh 52 and prongs 53 are mounted on and supported by a pair of chains 102, only one of which is shown in FIG. 7. Each of the chains 102 extends around sprockets 103 and 104 at opposite ends of conveyor 51. The two lower sprockets of conveyor 51 may be idler sprockets and the two sprockets 103 may be fixed to an upper shaft 105 that is likewise fixed to the drive shaft of motor 56 shown in FIG. 1.

The manner in which conveyor 51 is constructed is shown in FIGS. 8 and 9. Opposite ends of inverted T-shaped members 106 and 107 are bolted with four bolts to chains 102. Each of the inverted T-shaped members 106 and 107 and all of those employed on the conveyor 51 may be constructed in a manner identical to that shown in FIGS. 8 and 9.

As shown in FIG. 9, prongs 53 are welded to inverted T-shaped member 106. A clip 108 is welded to the bottom of member 106 at 109 and 110. Wire mesh at 52 is held between members 106 and 107 by a cylindrical steel rod 111 which extends through the edge loops thereof.

In the operation of the harvester 10 of the present invention, arms 42 and 38 are rotated to the left as viewed in FIG. 1 by operation of ram 44 to raise frame 37 to a vertical position almost in contact with, if not in contact with, the front edge of bow 12. This operation is performed immediately subsequent to a harvesting operation. Frame 37 is therefore in a retracted position when the harvester enters port and is maintained in that position when going to and from a kelp bed.

Once harvester 10 arrives at a kelp bed, frame 37 is lowered to the position shown in FIG. 1. Chain 64 is then driven continuously in one direction around frame 37 to cause the set of knife sections 63 to pass between knife sections 79 and 80. Kelp in a kelp bed is then cut in a shearing action of knife sections 63 passing between knife sections 79 and 80. Note will be taken that knife sections 79 and 80 extend all the way up and down sides 37' and 37'' of frame 37 and all the way across the bottom 37''' of frame 37 shown in FIG. 3. Thus, kelp at any position within the water 26 is cut and passes into passageway 98 in the space between the surface of water 26 and net 45.

As soon as the kelp is cut, the cut kelp floats near the surface of water 26. Ordinarily, motors 27 are operated to turn screws 29 to propel barge 11 forward or to the right as shown in FIG. 1. This causes water in cut kelp in net 45 to move rearwardly or to the left as shown in FIG. 1 over the top of wire mesh at 52 in conveyor 51. Wire mesh 52 and prongs 53 of conveyor 51 thus then pick up or effectively strain kelp from water flowing in the direction of arrows 100 shown in FIG. 7 and allow the water to pass in the direction of arrows 101 through holes 57 and 58 as shown in FIGS. 3 and 7 while lifting the cut kelp on board above bulkhead 20 and dumping it also in the direction of arrow 99 into the bottom of barge 11 rearward of bow bulkhead 14.

In this operation, should the lower end of frame 37 strike a rock or other underwater obstruction frame 37 will rotate to the right as viewed in FIG. 1 about shaft 39. Once frame 37 has risen over the rock or obstruction cord reel 62, by applying tension to cable 61, will pull frame 37 back to an approximately vertical position as shown in FIG. 1 by applying a rearward force to the upper end of arms 60.

In accordance with the foregoing, it will be appreciated that the cutter assembly 36 is protected from damage by being rotatably mounted about shafts 39 so that frame 37 can retract in the event of a collision with a rock or other underwater obstruction. Furthermore, due to the fact that frame 37 is movable relative both to barge 11 and to conveyor 51, any collision between cutter assembly 36 and an underwater obstruction will not affect or damage either barge 11 or conveyor 51 as such a collision would in the prior art. This prior art disadvantage was due to the fact that the cutter assembly was in fact fixed to the conveyor, and the conveyor was fixed to the barge.

Note will be taken that conveyor 51 is recessed in passageway 98. Both sides of the bow 12 and the forward and lower edge 48 of bulkhead 28 serve to protect conveyor 51 throughout its entire length. As stated previously, the forward and lower edge of bulkhead 20 indicated at 48 in FIG. 1 lies forward of the forward and lower end of conveyor 51. This is more clearly shown in FIG. 7. Note will be taken that this is an improvement over the prior art in that the prior art conveyor was suspended outwardly and forwardly of the bow of a barge. It projected downwardly into the water in a position exposed to damage by collision with underwater obstructions of any kind.

In regard to the position of conveyor 51, it is noted that it is fixed in position relative to barge 11 but that it is not fixed relative to cutter assembly 36, as in the prior art. Hence, a collision of a cutter assembly 36 with an underwater obstruction will not damage conveyor 51.

It is a feature of the present invention that two sets of knife sections 79 and 80 are provided on each side of movable knife sections 63. Cutter assembly 36, for this reason, provides a positive and effective shear for kelp.

Due to the fact that the travel of knife sections 63 is continuous in one direction around the rectangular frame 37 as opposed to a reciprocatory travel, it is unnecessary to move pitmans or the like as are required to produce reciprocatory motion of shearing cutter blades as employed in conventional grain or kelp harvesters of the prior art. Due to the fact that a reciprocatory motion is eliminated, the cutter assembly 36 is also particularly adapted for a heavier duty use.

Note will be taken that net 45 serves several purposes. Its flexible and portable character makes it possible for cutter assembly 36 to perform its several functions. In other words, it can be retracted in a safe position traveling to and from a kelp bed or to and from port. Further, in operation, it can tilt upwardly and to the rear to avoid collision with underwater obstructions. The flexible character of net 45 facilitates this movement. In other words, as frame 37 moves relative to barge 11, net 45 must, of course, fold or bend in accordance with this relative movement. Note will be taken if net section 47 is a chain link fence, it would be desirable if it can fold or roll about a horizontal axis.

Further, net 45 prevents the loss of cut kelp. It is also an advantage of the present invention that barge 11 is not so easily overturned because the load in the barge is kept deep inside the hull thereof between bulkheads 14 and 15. This is to distinguish the barge of the present invention from the high deck mounting of the kelp load in the said patent of the prior art. As stated previously, it is an advantage of the present invention that holes 57 and 58 are provided. Holes 57 and 58 allow water to pass completely through bow 12 of barge 11. This reduces the water pressure inside net 45. Were holes 57 and 58 not provided, cut kelp would plug the interstices of net 45. Water pressure would therefore build up inside of net 45 as barge 11 moved forward. Net 45 would then bulge and pull frame 37 unyieldingly to a position inclined downwardly toward the rear. Cutter assembly 37 would then operate inefficiently.

It is also a feature of the invention that cut kelp is effectively strained from the water in net 45 by the position of conveyor 51 over the openings of passageways 57 and 58 that extend through bulkhead 20.

It is an unusual advantage of the present invention that the movable character of cutter assembly 36 and frame 37 about the pivot of shafts 39 aids in maneuverability of the barge 11. That is, cutter assembly 36 or frame 37 can be used to determine whether or not the hull of barge 11 will pass over a submerged object.

What is claimed is:

1. An apparatus for cutting marine plants, said apparatus including a barge having a bow and a stern, the combination comprising: a mower; upright means to suspend said mower from said bow in a vertical position submerged in the water; mounting means fixed to the bow of said barge and having extremities which extend forwardly from said bow over the water, said upright means being pivotally connected to the extremities of said mounting means about an axis; said upright means and said mower being rotatable rearwardly and upwardly about said axis; and return means to yieldingly resist movement of said mower and said upright means rearwardly and upwardly about said axis to permit said mower to move out of the way of underwater rocks and other obstructions and to prevent damaging collisions therewith.

2. The invention as defined in claim 1, wherein said barge has seaweed receiving means including a passageway and a net connected from said mower to said passageway.

3. The invention as defined in claim 1, wherein said barge has a cut seaweed receiving means in said bow, said upright means including a stanchion fixed to each end of said mower, and said mounting means being fixed to said bow so as to suspend said mower in front of said seaweed receiving means and spaced forwardly thereof.

4. The invention as defined in claim 3, wherein said stanchions are pivoted about a horizontal axis from said mounting means and wherein said return means includes a tagline having one end connected to the upper end of one of said stanchions above said axis, and a resiliently biased cord reel fixed to said mounting means, the other end of said tagline being fixed to said cord reel.

5. The invention as defined in claim 4, wherein said mounting means includes an arm pivoted to each of said stanchions and also pivoted to said bow, and means to rotate said arms.

6. The invention as defined in claim 3, wherein said seaweed receiving means includes a conveyor fixed to said bow.

7. The invention as defined in claim 2, wherein said mower also includes a sprocket in each corner of said frame, a chain around said sprockets, said movable knife sections being fixed to said chain, and power means to move said movable knife sections continuously in one direction.

8. The invention as defined in claim 6, wherein said seaweed receiving means includes a passageway having a bottom wall inclined upwardly toward said stern, said bottom wall having upper and lower edges, said conveyor having forward and rearward ends, said conveyor being fixed relative to said bottom wall in a rearwardly inclined position, the forward end of said conveyor being positioned rearward of the said lower edge of said bottom wall.

9. The invention as defined in claim 8, wherein said passageway has inner side walls having forward edges which project forwardly beyond the forward end of said conveyor.

10. The invention as defined in claim 9, wherein said seaweed receiving means also includes a flexible side netting section connected from each stanchion to a forward edge of a corresponding passageway side wall, and a flexible bottom netting section connected from said mower to the said lower edge of said bottom wall, the mutually adjacent edges of said sections being connected together.

11. The invention as defined in claim 10, wherein said mounting means includes power means to lift said mower out of the water, wherein said side netting sections are made of interconnected rings, and wherein said bottom netting section is chain link fence mounted to fold and to roll upwardly and rearwardly as said mower is lifted out of the water.

12. The invention as defined in claim 3, wherein said mower has a rectangular frame, inner and outer sets of stationary, forwardly extending knife sections on each stanchion and on the lower horizontal part of said frame, a set of laterally movable knife sections in a position extending forwardly to the space between said inner and outer sets of stationary knife sections, and power means to move said movable knife sections laterally.

13. The invention as defined in claim 3, wherein a net is connected from said mower and said stanchions to the bow of said barge.

14. The invention as defined in claim 13, wherein said bow has a hole therethrough inclined downwardly to the rear to facilitate the flow of cut seaweed through said receiving means.

15. A marine harvester comprising: a barge having a bow and a stern; cut seaweed receiving means in said bow, a mower, means to rotatably suspend said mower from said bow in a submerged position spaced forwardly of said seaweed receiving means; a flexible net connected between said mower and said bow and forming an enclosed passage between said mower and said bow, and said mower being rotatable rearwardly and upwardly toward said bow; a hole in said bow extending downwardly and rearwardly through said barge, said hole being positioned to receive water entering said bow with said cut seaweed so as to facilitate both the removal of water from said cut seaweed and the flow of said cut seaweed into said receiving means and to prevent said net from becoming filled with cut seaweed and thereby bulging out and pulling said mower to a rearward position due to a preponderance of pressure inside said net.

16. The invention as defined in claim 15 wherein said seaweed receiving means includes an open mesh conveyor positioned in front of and covering said hole to strain cut seaweed from water flowing therethrough and through said hole.

17. The invention as defined in claim 16, wherein said seaweed receiving means includes a passageway, said passageway including a pair of side walls and a bottom wall inclined upwardly to the rear, said conveyor being positioned over said bottom wall in a position also inclined upwardly to the rear, said hole being positioned through said bottom wall in back of said conveyor.

18. An apparatus for cutting marine plants, said apparatus including a barge, the combination comprising: a frame to extend downwardly in the water, through the water and upwardly toward the surface of the water; said frame being in the shape of a closed rectangular loop and said frame having upper, lower and side members; means to suspend said frame from said barge in a position submerged in the water; closed loop flexible means extending completely around said frame; means to guide said flexible means around said frame; said flexible means including a sprocket in each corner of said frame and a chain extending around said sprockets; a first set of mower knife sections fixed to said frame; a second set of mower knife sections fixed to said flexible means; power means to move said flexible means continuously in one direction around said frame; said first set of mower knife sections being located on said lower and side members of said frame; said second set of mower knife sections being located all the way around said flexible means; said first set of mower knife sections including inner and outer sets of stationary, forwardly extending knife sections, and said second set of mower knife sections positioned to extend forwardly through the space between said inner and outer sets of stationary knife sections.

19. Apparatus for cutting marine plants, said apparatus comprising: a barge having a bow and a stern; said barge having a seaweed receiving passageway at its bow; a mower having at least one movable horizontal knife section; a stanchion fixed at each end of said mower; mounting means suspending both of said stanchions from said bow in positions to support said mower directly in front of but spaced from said passageway, said stanchions being pivoted about a horizontal axis from said mounting means; and means to yieldingly resist rotation of movement of said mower and said stanchions rearwardly about said axis to permit said mower to rotate rearwardly and upwardly out of the way of underwater rocks and other obstructions and to prevent damaging collisions therewith.

References Cited

UNITED STATES PATENTS

| | | | |
|---|---|---|---|
| 323,609 | 8/1885 | Turner | 56—290 |
| 1,028,671 | 6/1912 | Brooks | 56—9 |
| 1,120,206 | 12/1914 | Knapp | 56—8 |
| 1,138,541 | 5/1915 | Conekin. | |
| 1,344,626 | 6/1920 | Ellis | 56—9 |
| 1,687,422 | 10/1928 | Bensien | 172—265 X |
| 2,651,874 | 9/1953 | Key | 114—.5 |
| 2,724,315 | 11/1955 | Roberson | 172—265 |
| 3,130,531 | 4/1964 | Wolesagle | 56—8 |
| 3,238,708 | 3/1966 | Zickefoose | 56—9 |
| 3,240,453 | 3/1966 | Kiekhaefer | 248—4 |
| 3,286,447 | 11/1966 | Grinwald | 56—9 |
| 3,347,029 | 10/1967 | Grinwald | 56—9 |

FOREIGN PATENTS

| | | |
|---|---|---|
| 699,986 | 2/1931 | France. |

ROBERT PESHOCK, Primary Examiner

PASQUALE A. RAZZANO, Assistant Examiner

U.S. Cl. X.R.

114—0.5